(12) United States Patent
Kummetz et al.

(10) Patent No.: US 11,909,432 B2
(45) Date of Patent: Feb. 20, 2024

(54) UNIVERSAL DIGITAL CARD (UDC) FOR USE AS DIGITAL DONOR CARD OR DIGITAL DISTRIBUTION CARD

(71) Applicant: CommScope Technologies LLC, Hickory, NC (US)

(72) Inventors: Thomas Kummetz, Kissing (DE); Tyler J Hanson, Plymouth, MN (US); Ahmed H. Hmimy, Richardson, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/391,570

(22) Filed: Aug. 2, 2021

(65) Prior Publication Data

US 2022/0038126 A1 Feb. 3, 2022

Related U.S. Application Data

(60) Provisional application No. 63/060,547, filed on Aug. 3, 2020.

(51) Int. Cl.
*H04B 1/18* (2006.01)
*H04B 1/40* (2015.01)
*H01Q 1/24* (2006.01)
*H04B 1/00* (2006.01)

(52) U.S. Cl.
CPC .............. *H04B 1/18* (2013.01); *H01Q 1/246* (2013.01); *H04B 1/0032* (2013.01); *H04B 1/40* (2013.01)

(58) Field of Classification Search
CPC ........ H01Q 1/246; H04B 1/0032; H04B 1/18; H04B 1/40
See application file for complete search history.

(56) References Cited

U.S. PATENT DOCUMENTS

| 7,929,487 B2 | 4/2011 | Wijngaarden et al. |
| 8,165,100 B2 | 4/2012 | Sabat et al. |
| 8,983,301 B2 | 3/2015 | Baker et al. |
| 9,112,611 B2 | 8/2015 | Palanisamy et al. |
| 9,712,343 B2 | 7/2017 | Dussmann et al. |

(Continued)

FOREIGN PATENT DOCUMENTS

WO 2018065983 A1 4/2018

OTHER PUBLICATIONS

International Searching Authority, "International Search Report and Written Opinion from PCT Application No. PCT/US2021/044155 dated Nov. 19, 2021", from Foreign Counterpart to U.S. Appl. No. 17/391,570, dated Aug. 2, 2021, pp. 1-8, Published in: WO.

*Primary Examiner* — Nguyen T Vo
(74) *Attorney, Agent, or Firm* — Fogg & Powers LLC

(57) ABSTRACT

One embodiment is directed to a universal digital card (UDC) for use in a node of a distributed antenna system (DAS). The UDC is configured to convert data between an external interface format used to communicate on an external communication link and a fronthaul interface format natively used in the DAS. The UDC is configured to be selectively used either as: a donor card to communicatively couple the node to one or more base station entities via the external digital interface or a distribution card to communicatively couple the node to one or more non-DAS nodes, hubs, switches, or remote radio heads or one or more other DAS nodes access points. Other embodiments are disclosed.

22 Claims, 7 Drawing Sheets

(56) References Cited

U.S. PATENT DOCUMENTS

| | | | |
|---|---|---|---|
| 9,929,810 | B2 | 3/2018 | Berlin et al. |
| 10,187,151 | B2 | 1/2019 | Harel et al. |
| 10,355,769 | B2 | 7/2019 | Lange |
| 10,361,783 | B2 | 7/2019 | Harel et al. |
| 10,383,171 | B2 | 8/2019 | Kim et al. |
| 11,444,809 | B2 | 9/2022 | Hanson |
| 2012/0314797 | A1* | 12/2012 | Kummetz ............... H04L 27/34 375/295 |
| 2013/0010786 | A1 | 1/2013 | Wethington et al. |
| 2013/0017863 | A1* | 1/2013 | Kummetz ............... H04L 49/40 455/562.1 |
| 2014/0016583 | A1 | 1/2014 | Smith |
| 2014/0269859 | A1 | 9/2014 | Hanson et al. |
| 2015/0256358 | A1 | 9/2015 | Stapleton et al. |
| 2017/0026857 | A1 | 1/2017 | Kummetz et al. |
| 2018/0034669 | A1 | 2/2018 | Barbieri et al. |
| 2018/0048357 | A1 | 2/2018 | Stewart et al. |
| 2019/0313227 | A1 | 10/2019 | Berlin et al. |
| 2019/0341970 | A1 | 11/2019 | Lange |
| 2021/0029562 | A1* | 1/2021 | Notargiacomo ...... H04W 48/18 |

\* cited by examiner

UNIVERSAL DIGITAL CARD (UDC) FOR USE AS DIGITAL DONOR CARD OR DIGITAL DISTRIBUTION CARD

CROSS-REFERENCE TO RELATED APPLICATIONS

This application claims the benefit of U.S. Provisional Patent Application Ser. No. 63/060,547, filed on Aug. 3, 2020, entitled "UNIVERSAL DIGITAL CARD (UDC) FOR USE AS DIGITAL DONOR CARD OR DIGITAL DISTRIBUTION CARD", the entirety of which is incorporated herein by reference.

BACKGROUND

A distributed antenna system (DAS) is often used to improve the coverage provided by one or more base station entities. Typically, a donor card is used to couple each base station entity to a node of the DAS (for example, to a central access node of the DAS). The various nodes of the DAS also include one or more distribution cards that are used to communicatively couple each node to other nodes of the DAS or to access points of the DAS.

Typically, each donor card is designed to be used with one particular type of base station entity. Also, donor cards and distribution cards are typically configured to be used only as a donor card or a distribution card, respectively. Moreover, only access points specifically designed to work with a particular vendor's DAS have traditionally been used with DASs (and the various nodes thereof).

SUMMARY

One embodiment is directed to a universal digital card (UDC) for use in a subrack of a node of a distributed antenna system (DAS). The UDC comprises an external digital interface to communicatively couple the UDC to an external communication link used to transmit and receive data in any of a plurality of different external interface formats. The UDC further comprises a backplane interface to communicatively couple the UDC to a backplane of the subrack. The backplane is configured to communicate fronthaul data in a digital fronthaul interface format natively used in the DAS. The UDC is configured to: receive data formatted according to any of the plurality of external interface formats from the external communication link via the external digital interface; convert the received data to the digital fronthaul interface format natively used in the DAS; communicate the converted data over the backplane of the subrack via the backplane interface; receive data formatted according to the digital fronthaul interface format natively used in the DAS from the backplane of the subrack via the backplane interface; convert the received data to any of the plurality of external interface formats; and communicate the converted data over the external communication link via the external digital interface. The UDC is configured to be selectively used either as: a donor card to communicatively couple the node to one or more base station entities via the external digital interface; or a distribution card to communicatively couple the node to one or more non-DAS nodes, hubs, switches, or remote radio heads or one or more other DAS nodes or access points.

Another embodiment is directed to a node of a distributed antenna system (DAS) comprising a subrack comprising a plurality of slots and a backplane. The DAS further comprises a universal digital card (UDC). The UDC comprises an external digital interface to communicatively couple the UDC to an external communication link used to transmit and receive data in any of a plurality of different external interface formats. The UDC further comprises a backplane interface to communicatively couple the UDC to the backplane of the subrack. The backplane is configured to communicate fronthaul data in a digital fronthaul interface format natively used in the DAS. The UDC is configured to: receive data formatted according to any of the plurality of external interfaces formats from the external communication link via the external digital interface; convert the received data to the digital fronthaul interface format natively used in the DAS; communicate the converted data over the backplane of the subrack via the backplane interface; receive data formatted according to the digital fronthaul interface format natively used in the DAS from the backplane of the subrack via the backplane interface; convert the received data to any of the plurality of external interface formats; and communicate the converted data over the external communication link via the external digital interface. The UDC is configured to be selectively used either as: a donor card to communicatively couple the node to one or more base station entities via the external digital interface; or a distribution card to communicatively couple the node to one or more non-DAS nodes, hubs, switches, or remote radio heads or one or more other DAS nodes or access points.

Other embodiments are disclosed.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
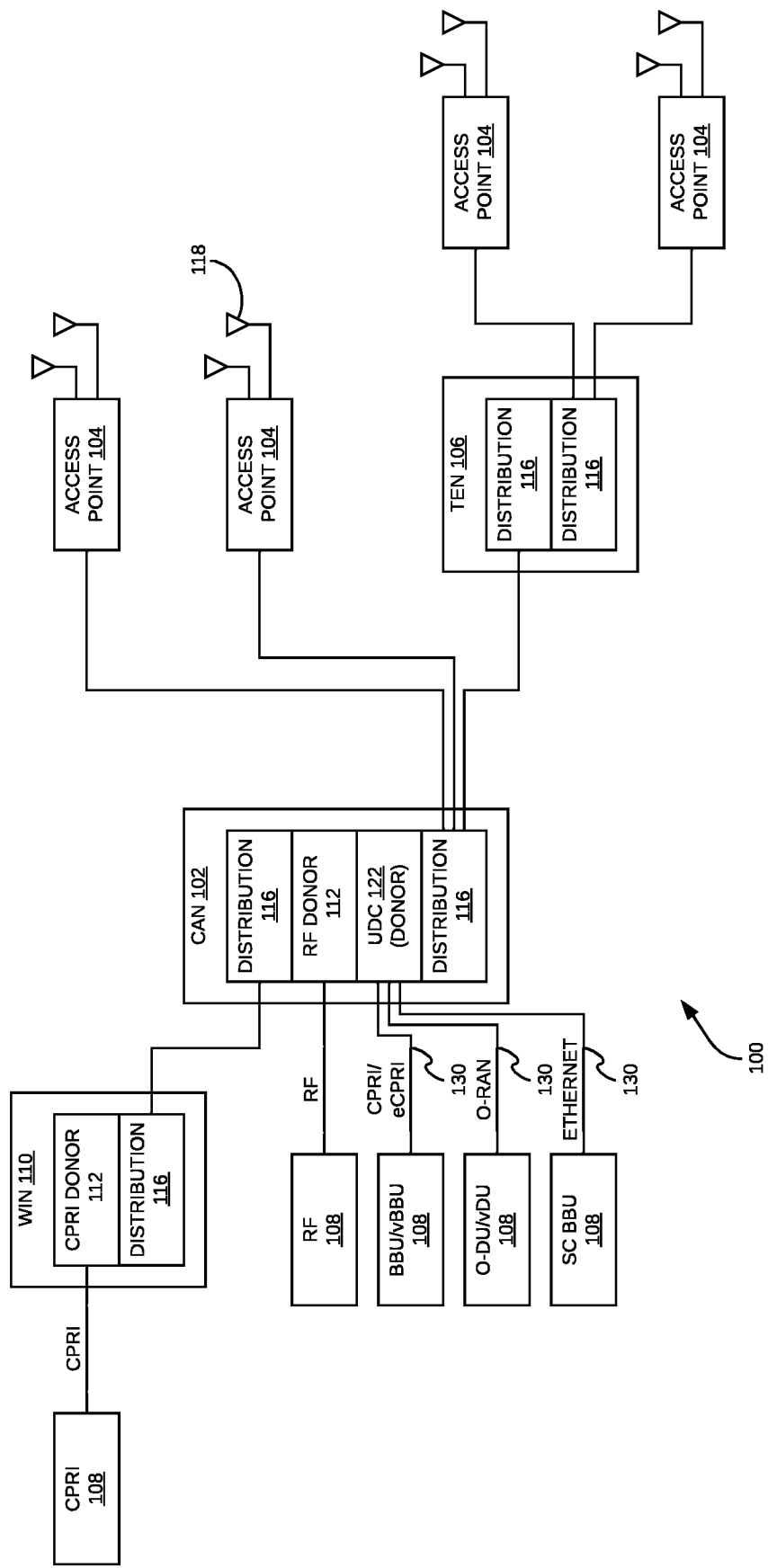
FIG. 1 is a block diagram of one exemplary embodiment of a first use case in which a universal digital card can be used.

FIG. 1 is a block diagram of one exemplary embodiment of a distributed antenna system (DAS) 100 in which the universal digital card 122 described below can be used.

In this exemplary embodiment, the DAS 100 includes one or more central access nodes (CANs) 102 (also referred to as "master units," "host units," or "hub units") that are communicatively coupled to a plurality of remotely located access points 104 (also referred to as "antenna units," "radio units," "remote units," or "remote antenna units"), where each access point 104 can be coupled directly to one or more of the central access nodes 102 or indirectly via one or more other access point 104 and/or via one or more transport expansion nodes (TENs) 106 (also referred to as "intermediary" or "expansion" units or nodes).

The DAS 100 is typically used to improve the coverage provided by one or more base station entities 108 that are coupled to the central access nodes 102. Each base station entity 108 coupled to the DAS 100 is typically served by one or more access points 104 of the DAS 100. By using such a simulcast approach, the DAS 100 increases the coverage area for the capacity provided by that base station entity 108.

These base station entities 108 can be coupled to the one or more central access nodes 102 via one or more cables or via a wireless connection (for example, using one or more donor antennas). The DAS 100 can also include one or more wide-area integration nodes (WINs) 110 (also referred to as "host-to-host" nodes) that are used to communicatively couple remotely located base station entities 108 to the DAS 100 (more specifically, to one or more CANs 102 of the DAS 100).

The wireless service provided by the base station entities 108 can include commercial cellular service and/or private or public safety wireless communications.

Figure 2:
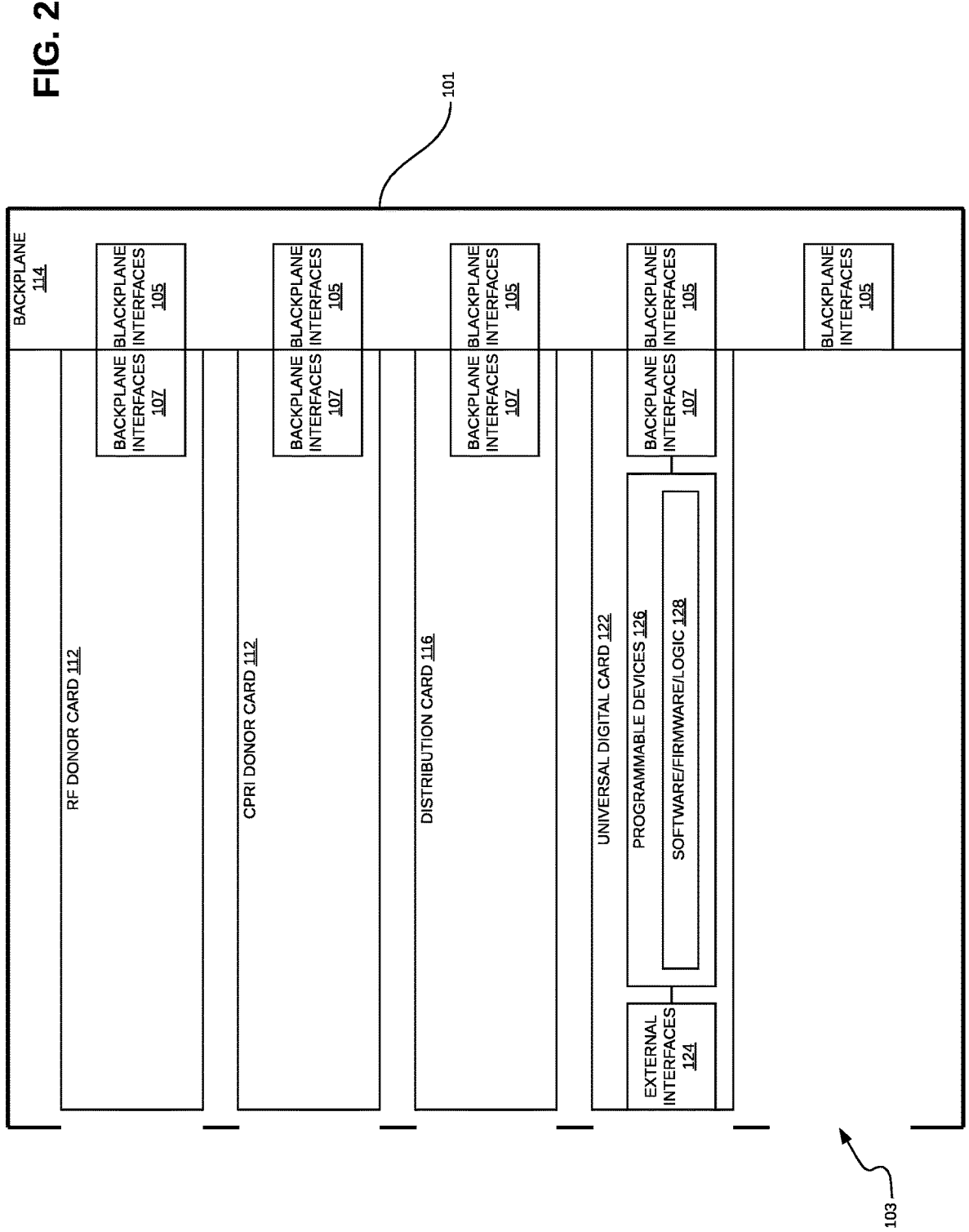
FIG. 2 is a block diagram of one exemplary embodiment of a universal digital card and one exemplary embodiment of a subrack having multiple slots into which various types of cards can be inserted.

In this exemplary embodiment, each node of the DAS 100 comprises a subrack 101 (shown in FIG. 2) having multiple slots 103 into which various types of cards can be inserted. In this exemplary embodiment, the subrack 101 also comprises a backplane 114. As shown in FIG. 2, the backplane 114 comprises a set of one or more backplane interfaces 105 for each slot 103 of the subrack 101 that is configured to be connected to (or otherwise interface with) a corresponding set of one or more backplane interfaces 107 of a card that is inserted into that slot 103. The backplane interfaces 105 on the backplane 114 and the backplane interfaces 107 of the cards inserted into the slots 103 of the subrack 101 are used to couple the components of the cards to the components of the backplane 114. In this way, the cards inserted into the slots 103 of the subrack 101 can communicate with the backplane 114 and, via the backplane 114, with other cards inserted into that subrack 101.

In this exemplary embodiment, each backplane 114 comprises an active backplane that is configured to process, format, and route data communicated between the cards inserted into the subrack 101. For example, each backplane can be implemented using one or more programmable devices that execute, or are otherwise programmed or configured by, software, firmware, or configuration logic in order to implement the functionality described here as being performed by the backplane. The one or more programmable devices can be implemented in various ways (for example, using programmable processors (such as microprocessors, co-processors, and processor cores integrated into other programmable devices) and/or programmable logic (such as field programmable gate arrays (FPGAs) and system-on-chip packages)). Where multiple programmable devices are used, all of the programmable devices do not need to be implemented in the same way. The backplane 114 can be implemented in other ways. For example, the backplane 114 could be implemented as a passive backplane, in which case the processing described here as being performed by the backplane 114 would be performed by one or more of the cards inserted into the slots 103 of the subrack 101.

In general, each node of the DAS 100 to which a base station entity 108 is first coupled to (for example, a CAN 102 or a WIN 110) includes one or more donor cards 112. Each donor card 112 is configured to couple one or more base station entities 108 to that node (and, more generally, to the DAS 100) over an external communication link (the link being "external" in the sense that it is external to the node). More specifically, each donor card 112 is configured to receive downlink data from each base station entity 108 coupled to that donor card 112 in a format suitable for use with the particular type of base station entity coupled to that donor card 112, convert the received downlink data to a digital fronthaul interface format suitable for communicating over the backplane 114 of the node (and otherwise natively used in the DAS 100 more generally), and communicate the converted data to the backplane 114 of the node 100 for processing, formatting, and/or routing by the backplane 114. Also, each donor card 112 is configured to receive uplink data from the backplane 114 of the node in the digital fronthaul interface format natively used in the DAS 100, convert the received uplink data to the format suitable for use with the particular type of base station entity 108 coupled to that donor card 112, and communicate the converted uplink data to an appropriate base station entity 108. In the exemplary embodiment described here in connection with FIG. 1, the digital fronthaul interface format natively used in the DAS 100 comprises a proprietary synchronous time-domain baseband in-phase and quadrature (IQ) fronthaul interface (also referred to as a fronthaul interface using an "Option 8 functional split") that can be communicated over cabling using Ethernet physical layer devices.

One specific type of donor card 112 shown in FIGS. 1 and 2 is an RF donor card 112 that is configured to couple a node (and, more generally, the DAS 100) to base station entities 108 using the external analog radio frequency (RF) interface of each base station entity 108 that would otherwise be used to couple the base station entity 108 to one or more antennas (if the DAS 100 were not being used).

Each RF donor card 112 is configured to receive downlink data from each base station entity 108 coupled to that RF donor card 112 in the form of analog downlink RF signals, convert the received analog downlink RF signals to the digital fronthaul interface format natively used in the DAS 100 (for example, by digitizing, digitally down-converting, and filtering the received analog downlink RF signals), and communicate the converted data to the backplane 114 of the node for processing, formatting, and/or routing by the backplane 114. Also, each RF donor card 112 is configured to receive uplink data from the backplane 114 in the digital fronthaul interface format natively used in the DAS 100, convert the received uplink data to analog uplink RF signals (for example, by digitally up-converting and performing a digital-to-analog process), and communicate the analog uplink RF signals to appropriate base station entities 108.

Another specific type of donor card 112 shown in FIG. 1 is a digital donor card 112 that is configured to communicatively couple the node (and, more generally, the DAS 100) to base station entities 108 (more specifically, a baseband units (BBUs)) using a digital baseband fronthaul interface that would otherwise be used to couple each BBU to a remote radio head (RRH) (if the DAS 100 were not being used). In one implementation, the digital baseband fronthaul interface comprises a time-domain baseband IQ fronthaul interface implemented in accordance with the Common Public Radio Interface ("CPRI") specification. Other digital donor cards 112 can be configured to use other digital baseband fronthaul interfaces. Each digital donor card 112 is configured to receive downlink data from each BBU 108 coupled to that donor card 112 in the digital baseband fronthaul interface format used by that BBU 108, convert the received downlink data to the digital fronthaul interface format natively used in the DAS 100 (for example, by re-sampling, synchronizing, combining, separating, gain adjusting, etc.), and communicate the converted data to the backplane 114 of the node for processing, formatting, and/or routing by the backplane 114. Also, each digital donor card 112 is configured to receive uplink data from the backplane 114 of the node in the digital fronthaul interface format natively used in the DAS 100, convert the received uplink data to the digital baseband fronthaul interface format used by the BBUs 108 coupled to that donor card 112 (for example, by re-sampling, synchronizing, combining, separating, gain adjusting, etc.), and communicate the converted uplink data to appropriate BBUs 108.

The various nodes of the DAS 100 are communicatively coupled to other nodes of the DAS 100 (for example, CANs 102, TENs 106, and WINS 110) and to the access points 104 using distribution cards 116. Each distribution card 116 is configured to communicatively couple the node into which the card 116 is inserted to one or more other DAS nodes or access points 104 over one or more external communication links implemented using a particular type of cabling. Each distribution card 116 includes one or more cable interfaces (not shown) to couple that card 116 to the cabling used to implement each such external communication link.

A distribution card 116 can be used to communicatively couple the node into which the card 116 is inserted to an access point 104. In this case, the distribution card 116 receives downlink data intended for that access point 104 from the backplane 114 of the node that the card 116 is inserted into and transmits the received downlink data over the external communication link (and associated cabling) used to couple the distribution card 116 to that access point 104. The data is communicated in the digital fronthaul interface format natively used in the DAS 100 (which in this exemplary embodiment comprises a proprietary synchronous time-domain baseband IQ fronthaul interface format that can be communicated over cabling using Ethernet physical layer devices). The downlink data transmitted to that access point 104 includes downlink data for each base station entity 108 served by that access point 104. The access point 104 receives the downlink data transmitted to it and uses the received downlink data to generate one or more downlink radio frequency signals for each base station entity 108 served by that access point 104 and radiates the one or more downlink radio frequency signals from one or more coverage antennas 118 associated with that access point 104 for reception by user equipment served by that base station entity 108.

Likewise, the access point 104, for each base station entity 108 served by that access point 104, receives uplink data transmitted from user equipment served by that base station entity 108. The uplink user data is received as one or more analog uplink RF signals received via the one or more coverage antennas 118 associated with that access point 104. For each served base station entity 108, the access point 104 converts the associated received analog uplink RF signals to produce uplink data for that base station entity 108 in the digital fronthaul interface format natively used in the DAS 100. The access point multiplexes (frames) the uplink data for the various base station entities 108 served by that access point 106 and communicates the multiplexed uplink data over the external communication link (and associated cabling) used to couple the distribution card 116 to that access point 104. The distribution card 116 receives the uplink data transmitted from that access point 104 and communicates the received uplink data to the backplane 114 of the node that the card 116 is inserted into.

A distribution card 116 can be used to couple the node into which the card 116 is inserted to another node of the DAS 100 in different ways. A distribution card 116 can be used to couple the node into which the card 116 is inserted to another "downstream" node over an external communication link. For example, a distribution card 116 inserted into a CAN 102 can be used to couple the CAN 102 to a TEN 106 over an external communication link or inserted into a WIN 110 to couple the WIN 110 to a CAN 102 over an external communication link. If used in this way, the distribution card 116 receives downlink data intended for the downstream node from the backplane 114 of the node that the card 116 is inserted into and transmits the received downlink data to the downstream node over the external communication link (and associated cabling) used to couple the distribution card 116 to that downstream node. Likewise, the distribution card 116 receives uplink data transmitted from that downstream node via the external communication link (and associated cabling) and communicates the received uplink data to the backplane 114 of the node that the card 116 is inserted into.

A distribution card 116 can also be used to couple the node into which the card 116 is inserted to another "upstream" node over an external communication link. For example, a distribution card 116 inserted into a TEN 106 can be used to couple the TEN 106 to a CAN 102 over an external communication link or inserted into a CAN 102 to couple the CAN 102 to a WIN 110 over an external communication link. If used in this way, the distribution card 116 receives downlink data transmitted from that upstream node via the external communication link (and associated cabling) used to couple the distribution card 116 to that upstream node and communicates the received downlink data to the backplane 114 of the node that the card 116 is inserted into. Likewise, the distribution card 116 receives uplink data intended for that upstream node from the backplane 114 of the node that the card 116 is inserted into and transmits the received uplink data to the upstream node over the external communication link (and associated cabling) used to couple the distribution card 116 to that upstream node.

In the exemplary embodiment shown in FIG. 1, some of the distribution cards 116 are configured to communicate over optical cables and these distribution cards 116 are also referred to here as "optical distribution cards" 116. Also, in the example shown in FIG. 1, some of the distribution cards 116 are configured to communicate over copper cables (for example, twisted-pair cables or coaxial cables) and are also referred to here as "copper distribution cards" 116. In this example, the copper distribution cards 116 can also be configured to provide power to access points 104 (or other DAS nodes) over the copper cables (for example, using Power-over-Ethernet (PoE) or direct current (DC) line-power techniques).

The backplane 114 used in the nodes of the DAS 100 comprises an active backplane that is configured to process, format, and route data communicated between the cards 112, 116, 122 inserted into each node. The backplane 114 replicates downlink data for each base station entity 108 as needed to communicate with the various access points 104 serving that base station entity 108 and performs a digital summation process for corresponding uplink baseband IQ samples received from the various access points 104 serving each base station entity 108. The backplane 114 multiplexes and demultiplexes data as needed to communicate it between the cards 112, 116, and 122 inserted into each node.

Other types of cards can be inserted into the subrack 101 used to implement each node of the DAS 100. For example, the subrack 101 can be configured to include a dedicated slot 103 into which a system user interface card (not shown) can be inserted. The system user interface card is configured to implement a local management interface for the associated node. The system user interface card can include one or more Ethernet interfaces via which external devices or systems can be coupled to the system user interface card in order to communicate with the management interface implemented for the DAS 100. Also, the subrack 101 can be configured to include one or more dedicated slots 103 into which auxiliary transport cards (not shown) can be inserted. Each auxiliary transport card is configured to enable pass-through Ethernet connections to other IP devices (such as Wi-Fi access points or security cameras) that may be coupled to various nodes of the DAS 100, thereby enabling these IP devices to share the cabling infrastructure of the DAS 100.

Other types of cards can be used to implement each node of the DAS 100.

Each subrack 101 also includes a power supply (not shown) that is configured to provide power to the backplane 114 and the various cards inserted into the slots 103 of the subrack 101.

In the exemplary embodiment shown in FIGS. 1 and 2, another general type of card that can be inserted into the slots 103 of the subrack 101 used to implement a node of the DAS 100 is a universal digital card (UDC) 122. For example, each UDC 122 can be inserted into a slot 103 of a subrack 101 used to implement a central access node (CAN), a transport expansion node (TEN), or a wide-area integration node (WIN) of the DAS 100.

In the exemplary embodiment shown in FIGS. 1 and 2, the donor cards 112 and the distribution cards 116 are configured to be used only as a donor card or a distribution card, respectively. In contrast to the donor cards 112 and the distribution cards 116, each UDC 122 can be selectively used as either a donor card or a distribution card. As a result, the UDC 122 is referred to as a "universal" card 122 instead of a "donor" or "distribution" card (even though each UDC 122 can be used as a donor card and as a distribution card). Also, in the exemplary embodiment shown in FIGS. 1 and 2, each UDC 122 can be used with various types of base station entities 108. In contrast, the dedicated donor cards 112 described above are configured to be used with only one particular type of base station entity 108.

In general, each UDC 122 (and the other cards, entities, and nodes described herein), and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.). Other embodiments can be implemented in other ways.

In the exemplary embodiment shown in FIG. 2, each UDC 122 comprises one or more external digital interfaces 124 to communicatively couple the UDC 122 to one or more external communication links 130 used to transmit and receive data in any of a plurality of different external interface formats. In one implementation, each external digital interface 124 is implemented using a respective small form-factor pluggable or enhanced small form-factor (collectively referred to here as "SFP+") interface into a which a suitable SFP+ transceiver module can be inserted for use with the particular type of external communication link 130 being used with that external digital interface 124.

For example, where the external communication links 130 coupled to the external digital interfaces 124 of a UDC 122 are CPRI communication links, SFP+ transceiver modules compatible with the CPRI specification can be used and data can be communicated using an external interface format that can be communicated over CPRI links (including, for example, a CPRI fronthaul interface format and a compressed CPRI fronthaul interface format). Where the external communication links 130 coupled to the external digital interfaces 124 of a UDC 122 are Ethernet communication links, Ethernet SFP+ transceiver modules can be used and data can be communicated using an external interface format that can be communicated over Ethernet links (including, for example, an Open Radio Access Network (O-RAN) fronthaul interface format that uses an Option 7-2 functional split, a CPRI fronthaul interface format, a compressed CPRI fronthaul interface format, an evolved CPRI (eCPRI) fronthaul interface format, an Institute of Electrical and Electronics Engineers (IEEE) 1914.3 Radio-over-Ethernet (RoE) interface format, a functional application programming interface (FAPI) or a network FAPI (nFAPI) interface format, and a proprietary frequency-domain baseband IQ fronthaul interface format configured for use over a switched Ethernet network).

As shown in FIG. 2, in this exemplary embodiment, each UDC 122 also comprises one or more backplane interfaces 107 configured to interface with a respective one or more backplane interfaces 105 of the backplane 114 of the subrack 101. As noted above, the backplane 114 is configured to communicate data in the digital fronthaul interface format natively used in the DAS 100 (which in this exemplary embodiment comprises a proprietary synchronous time-domain baseband IQ fronthaul interface format that can be communicated over Ethernet cabling using Ethernet physical layer devices).

As shown in FIG. 2, in this exemplary embodiment, each UDC 122 is implemented using one or more programmable devices 126 that execute, or are otherwise programmed or configured by, software, firmware, or configuration logic 128 in order to implement at least some of the functionality described here as being performed by the UDC 122. The one or more programmable devices 126 can be implemented in various ways (for example, using programmable processors (such as microprocessors, co-processors, and processor cores integrated into other programmable devices) and/or programmable logic (such as field programmable gate arrays (FPGAs) and system-on-chip packages)). Where multiple programmable devices 126 are used, all of the programmable devices do not need to be implemented in the same way. Each UDC 122 can be implemented in other ways.

The UDC 122 is configured, for each external digital interface 124, to receive data from an external communication link 130 coupled to that external digital interface 124 that is formatted according to one of the plurality of external interfaces supported by the UDC 122, convert the received data to the digital fronthaul interface format natively used by the DAS 100, and communicate the converted data over the backplane 114 of the subrack 101 into which the UDC 122 is inserted via an appropriate one or more backplane interfaces 107. In this exemplary embodiment, the UDC 122 is also configured, for each external digital interface 124, to receive data formatted according to the digital fronthaul interface format natively used in the DAS 100 from the backplane 114 of the subrack 101 into which the UDC 122 is inserted via an appropriate one or more backplane interfaces 107, convert the received data to one of the plurality of external interfaces supported by the UDC 122, and communicate the converted data over the external communication link 130 coupled to that external digital interface 124.

As noted above, each UDC 122 is configured to be used either as a donor card to communicatively couple the node into which the UDC 122 is inserted to one or more base station entities 108 via one or more of the external digital interfaces 124 or a distribution card to communicatively couple the node to one or more non-DAS nodes, hubs, switches, or remote radio heads or one or more other DAS nodes or access points via one or more of the external digital interfaces 124.

As shown in FIG. 1, in this exemplary embodiment, each UDC 122 is configured so that it can be used as a donor card with one or more base station entities 108 configured to communicate over the associated external communication links 130 using a time-domain baseband IQ fronthaul interface format (for example, baseband units (BBUs) or virtualized BBUs (vBBUs) configured to communicate time-domain baseband IQ data over the external communication link 130 using a CPRI fronthaul interface format, a compressed CPRI fronthaul interface format, an eCPRI fronthaul interface format, or a RoE fronthaul interface format). In this case, the UDC 122 is configured to convert downlink time-domain baseband IQ data received from each such base station entity 108 in the fronthaul interface format natively used by that base station entity 108 to the proprietary time-domain based IQ fronthaul interface format natively used in the DAS 100 for communicating over the backplane 114 (for example, by decompressing, re-sampling, synchronizing, combining, separating, gain adjusting, etc., the downlink data). Likewise, the UDC 122 is configured to convert uplink time-domain baseband IQ data received from the backplane 114 in the proprietary time-domain based IQ fronthaul interface format natively used in the DAS 100 to the fronthaul interface format used by that base station entity 108 (for example, by re-sampling, synchronizing, combining, separating, gain adjusting, compressing, etc., the uplink data).

As shown in FIG. 1, in this exemplary embodiment, each UDC 122 is configured so that it can be used as a donor card with one or more base station entities 108 configured to communicate over the external communication 130 links using a frequency-domain baseband IQ fronthaul interface format (for example, BBUs or vBBUs configured to communicate time-domain baseband IQ data over the external communication link 130 using a CPRI fronthaul interface format, a compressed CPRI fronthaul interface format, an eCPRI fronthaul interface format, or a RoE fronthaul interface format, O-RAN Distributed Units (O-DUs) or virtualized O-DUs (vDUs) configured to communicate over the external communication link 130 using an O-RAN fronthaul interface format, or small cell BBUs (SC BBUs) that are configured to communicate over the external communication link 130 using a proprietary frequency-domain baseband IQ fronthaul interface format configured for use over a switched Ethernet network). In this case, the UDC 122 is configured to convert downlink frequency-domain baseband IQ data received from each such base station entity 108 in the fronthaul interface format used by that base station entity 108 to the proprietary time-domain based IQ fronthaul interface format natively used in the DAS 100 for communicating over the backplane 114 (for example, by performing any decompression processing that is required, inverse Fast Fourier Transform (iFFT) processing and Cyclic Prefix (CP) insertion in order to produce time-domain baseband IQ data for any channels requiring such processing, and combining the time-domain baseband IQ data for the various channels to produce downlink data in the proprietary time-domain based IQ fronthaul interface format used for communicating over the backplane 114). Likewise, the UDC 122 is configured to convert uplink time-domain baseband IQ data received from the backplane 114 in the proprietary time-domain based IQ fronthaul interface format natively used in the DAS 100 to uplink frequency-domain baseband IQ data in the fronthaul interface format used by that base station entity 108 (for example, by performing CP removal, fast Fourier transform (FFT) and compression processing in order to produce frequency-domain baseband IQ data in a form suitable for use with the fronthaul interface format used by that base station entity 108).

Each UDC 122 can be configured to communicate with other types of base station entities 108 using other types of interface formats (for example, each UDC 122 can be configured to communicate with base station entities using an interface format that uses an Option 6 functional split (for example, a FAPI or nFAPI interface format).

As shown in FIG. 1, in this exemplary embodiment, each UDC 122 is configured so that it can be used as a distribution card with one or more DAS nodes or access points 104 configured to communicate over the external communication links 130 using a high-capacity transport interface format (for example, using a proprietary synchronous time-domain baseband IQ fronthaul interface format that can be communicated over Ethernet cabling using Ethernet physical layer devices that support 25 Gigabit Ethernet standards). In this case, the UDC 122 is configured to convert downlink data received from the backplane 114 in the proprietary time-domain based IQ fronthaul interface format natively used in the DAS 100 to the high-capacity transport interface format used by each high-capacity DAS node or access point 104 coupled to that UDC 122 (for example, by reformatting the downlink data). Likewise, the UDC 122 is configured to convert uplink data received from each high-capacity DAS node or access point 104 coupled to that UDC 122 in the high-capacity transport interface format used by that high-capacity DAS node or access point 104 to the proprietary time-domain based IQ fronthaul interface format natively used in the DAS 100 for communicating over the backplane 114 (for example, by reformatting the uplink data).

In the exemplary embodiment shown in FIG. 1, each UDC 122 is configured so that it can be used as a distribution card with one or more non-DAS nodes, hubs, switches, or remote radio heads configured to communicate over the external communication links 130 using a time-domain baseband IQ fronthaul interface format (for example, one or more remote radio heads configured to communicate time-domain baseband IQ data over the external communication link 130 using a CPRI fronthaul interface format, a compressed CPRI fronthaul interface format, an eCPRI fronthaul interface format, or a RoE fronthaul interface format). In this case, the UDC 122 is configured to convert downlink time-domain baseband IQ data received from the backplane 114 in the proprietary time-domain based IQ fronthaul interface format natively used in the DAS 100 to the time-domain based IQ fronthaul interface format used by each such non-DAS node, hub, switch, or remote radio head (for example, by re-sampling, synchronizing, combining, separating, gain adjusting, compressing, etc., the downlink data). Likewise, the UDC 122 is configured to convert uplink time-domain baseband IQ data received from each such non-DAS node, hub, switch, or remote radio head in the fronthaul interface format used by that non-DAS node, hub, switch, or remote radio head to the proprietary time-domain based IQ fronthaul interface format natively used in the DAS 100 for communicating over the backplane 114 (for example, by decompressing, re-sampling, synchronizing, combining, separating, gain adjusting, etc., the uplink data).

In the exemplary embodiment shown in FIG. 1, each UDC 122 is configured so that it can be used as a distribution card with one or more non-DAS nodes, hubs, switches, or remote radio heads configured to communicate over the external communication link 130 using a frequency-domain baseband IQ fronthaul interface format (for example, one or more remote radio heads configured to communicate frequency-domain baseband IQ data over the external communication link 130 using a CPRI fronthaul interface format, a compressed CPRI fronthaul interface format, an eCPRI fronthaul interface format, or a RoE fronthaul interface format, one or more O-RAN remote units (O-RUs) or virtual O-RUs (vRUs) configured to communicate over the external communication link 130 using an O-RAN fronthaul interface format, or small cell remote units (SC RUs) that are configured to communicate over the external communication link 130 using a proprietary frequency-domain baseband IQ fronthaul interface format configured for use over a switched Ethernet network). In this case, the UDC 122 is configured to convert downlink time-domain baseband IQ data received from the backplane 114 in the proprietary time-domain based IQ fronthaul interface format natively used in the DAS 100 to uplink frequency-domain baseband IQ data in the fronthaul interface format used by each such non-DAS node, hub, switch, or remote radio head (for example, by performing CP removal, FFT and compression processing in order to produce frequency-domain baseband IQ data in a form suitable for use with the frequency-domain baseband IQ fronthaul interface). Likewise, the UDC 122 is configured to convert uplink frequency-domain baseband IQ data received from each such non-DAS node, hub, switch, or remote radio head in the fronthaul interface format used by that non-DAS node, hub, switch, or remote radio head to the proprietary time-domain based IQ fronthaul interface format natively used in the DAS 100 for communicating over the backplane 114 (for example, by performing any decompression processing that is required, iFFT processing and CP insertion in order to produce time-domain baseband IQ data for any channels requiring such processing, and combining the time-domain baseband IQ data for the various channels to produce downlink data in the proprietary time-domain based IQ fronthaul interface format used for communicating over the backplane 114).

Each UDC 122 can be configured to communicate with other types of DAS and non-DAS nodes and/or using other types of interface formats.

The UDC 122 can be used in various use cases.

In general, each base station entity 108 coupled to the DAS 100 is served by one or more access points 104 of the DAS 100. Each base station entity 108 is coupled to the DAS 100 via a donor card (either a dedicated donor card 116 or a UDC 122 serving as a donor card) inserted into a node of the DAS 100 (either a CAN 102 or a WIN 110). The donor card receives downlink data communicated from that base station entity 108 via the external communication link 130 used to couple that base station entity 108 to that donor card. The downlink data is received in the particular interface format natively used by that base station entity 108. The donor card converts the downlink data from the format natively used by the base station entity 108 to the particular digital fronthaul interface format natively used in the DAS 100 (which is a proprietary time-domain based IQ fronthaul interface format in this example) and communicates the converted downlink data to the backplane 114 of the node in which the donor card is inserted. The downlink data for that base station entity 108 is communicated over the DAS 100 to the one or more access points 104 serving that base station entity 108. Each access point 104 receives the downlink data transmitted to it and uses the received downlink data to generate one or more downlink radio frequency signals for each base station entity 108 served by that access point 104 and radiates the one or more downlink radio frequency signals from one or more coverage antennas 118 associated with that access point 104 for reception by user equipment served by that base station entity 108.

Each access point 104 serving that base station entity 108 receives uplink data transmitted from user equipment served by that base station entity 108. The uplink user data is received as one or more analog uplink RF signals received via the one or more coverage antennas 118 associated with that access point 104. The access point 104 converts the received analog uplink RF signals to produce uplink data in the digital fronthaul interface format natively used in the DAS 100. The donor card coupled to that base station entity 108 receives summed uplink data for that base station entity 108 from the backplane 114 of the node that the donor card is inserted into. The summed uplink data for that base station entity 108 is generated in the DAS 100 from the separate uplink data produced by each of the various access points 104 serving that base station entity 108. The donor card converts the received summed uplink data to the format suitable natively used by that type of base station entity 108 and communicates the converted uplink data to that base station entity 108.

A first use case is illustrated in FIG. 1. In this use case, a UDC 122 is configured to be used as a donor card in order to couple three base station entities 108 to the DAS 100. In this example, the UDC 122 is inserted into a slot 103 of a subrack 101 that is being used to implement a CAN 102 for the DAS 100.

In this example, a first base station entity 108 comprises either a BBU or vBBU that is configured to communicate with the UDC 122 over a respective external communication link 130 using a CPRI fronthaul interface format, a compressed CPRI fronthaul interface format, or an eCPRI fronthaul interface format. A second base station entity 108 comprises either an O-DU or vDU that is configured to communicate with the UDC 122 over a respective external communication 130 using an O-RAN fronthaul interface format. A third base station entity 108 comprises a SC BBU that is configured to communicate with the UDC 122 over a respective external communication link 130 using a proprietary frequency-domain baseband IQ fronthaul interface format configured for use over a switched Ethernet network.

In this use case, a dedicated RF donor card 112 is used to couple a base station entity 108 to the DAS 100 via an analog RF interface. The dedicated RF donor card 112 is inserted into a slot 103 of the subrack 101 used to implement the same CAN 102 that the UDC 122 is inserted into. Also, in this use case, a dedicated digital donor card 112 is used to couple a remote located base station entity 108 to the DAS 100 via a CPRI link. The dedicated digital donor card 112, in this use case, is inserted into a slot 103 of a subrack 101 used to implement a WIN 110. The WIN 110 is coupled to the same CAN 102 that the UDC 122 is inserted into via respective dedicated distribution cards 116 inserted into the WIN 110 and CAN 102 and an external communication link 130 coupled therebetween.

For each of the three base station entities 108 coupled to the UDC 122, the UDC 122 is configured to act as a donor card for the DAS 100 and receive downlink baseband IQ data communicated from that respective base station entity 108 over the respective external communication link 130 in the interface format used by that base station entity 108, convert the downlink baseband IQ data to the digital fronthaul interface format natively used for in the DAS 100 (which is a proprietary time-domain based IQ fronthaul interface format in this example), and communicate the converted downlink data over the backplane 114 of the CAN 102. The converted downlink data can then be processed by the backplane 114 as if it were supplied to the DAS 100 using a traditional dedicated RF donor card 112 (and associated base station entity 108 coupled to that donor card 112 via an analog RF interface) or traditional dedicated digital donor card 112 (and associated base station entity 108 coupled to that donor card 112 via a CPRI link).

For example, the converted downlink data for any of the base station entities 108 coupled to the UDC 122 can be multiplexed with converted downlink data from one or both of the other base station 108 coupled to the UDC 122 and/or multiplexed with downlink data from the base station entity 108 coupled to the DAS 100 via the dedicated RF donor card 112 and/or downlink data from the base station entity 108 coupled to the DAS 100 via the dedicated digital donor card 118. The multiplexed downlink data can then be supplied to one or more access points 104 coupled to the CAN 102 via respective dedicated distribution cards 116 and, in this use case, a TEN 106. Each access point 104 receives the multiplexed downlink data and, for each base station entity 108 that has its downlink data included in the received multiplexed downlink data, uses that downlink data to generate one or more analog downlink RF signals that are radiated from one or more antennas 118 associated with that access point 104 to user equipment served by that base station entity 108.

Likewise, each access point 104, for each base station entity 108 served by that access point 104, receives uplink data transmitted from user equipment served by that base station entity 108. The uplink user data is received as one or more analog uplink RF signals received via the one or more antennas 118 associated with that access point 104. For each served base station entity 108, the access point 104 converts the received analog uplink RF signals in order to produce uplink data in the digital fronthaul interface format natively used in the DAS 100. The access point 104 multiplexes (frames) the uplink data for the various base station entities 108 served by that access point 108 and communicates it to the CAN 102 serving that access point 104.

For each base station entity 108 coupled to the UDC 122, the UDC 122 receives summed uplink data from the backplane 114 of the CAN 102. The summed uplink data for each base station entity 108 is generated in the DAS 100 from the separate uplink data produced by each of the various access points 104 serving that base station entity 108. The digital summation process is performed by the backplane 114 of the TEN 106 (for those access points 104 coupled to the CAN 102 via the TEN 106) and by the backplane 114 in the CAN 102. For each base station entity 108 coupled to the UDC 122, the UDC 122 converts the received summed uplink data to the format natively used by that type of base station entity 108 and communicates the converted uplink data to that base station entity 108 over the respective external communication link 130.

Typically, the downlink and uplink data associated with each base station entity 108 coupled to the UDC 122 are transmitted and received from multiple access points 104. By using such a simulcast approach, the DAS 108 increases the coverage area for the capacity provided by those base station entities 108.

Figure 3:
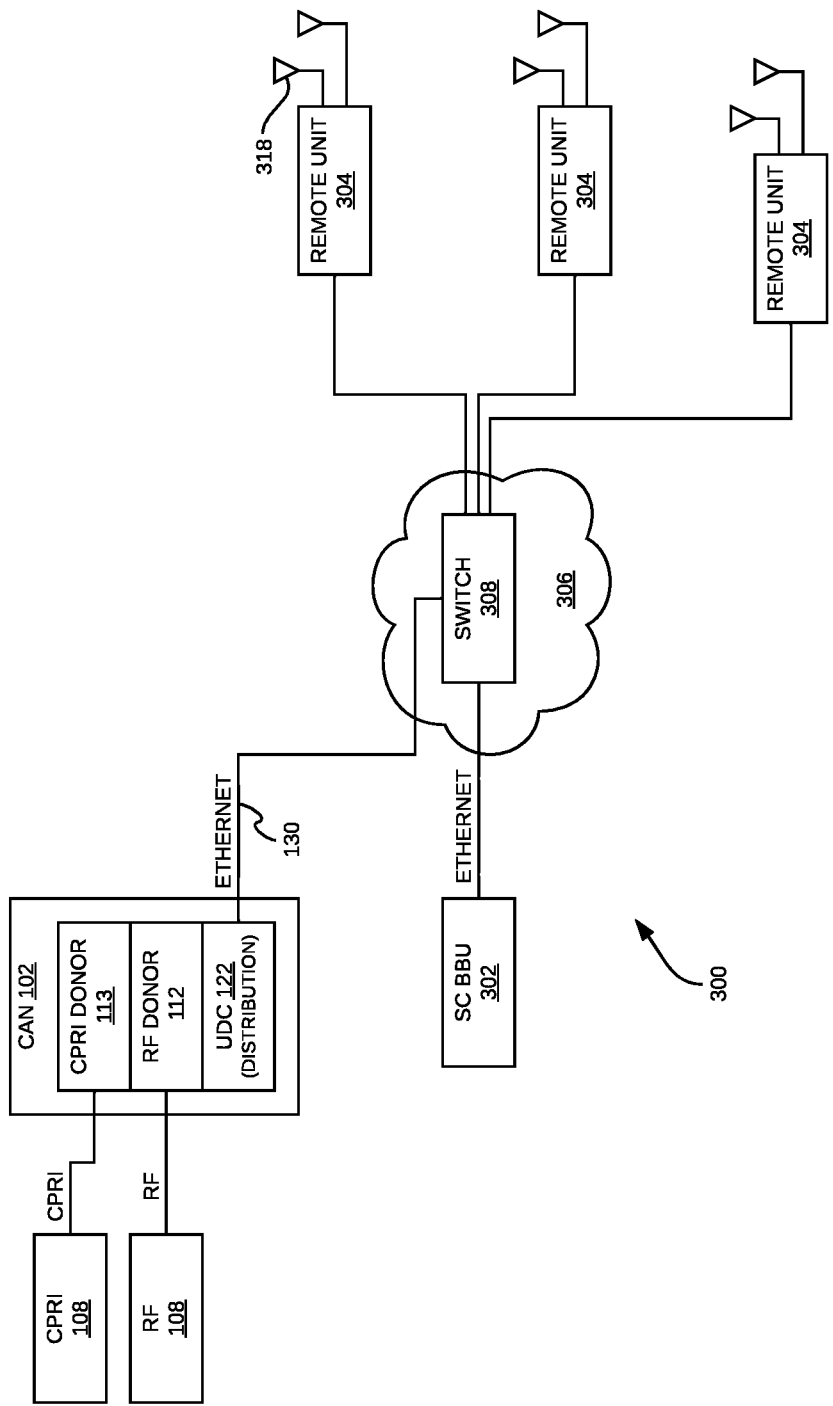
FIG. 3 is a block diagram of one exemplary embodiment of a second use case in which a universal digital card can be used.

FIG. 3 illustrates a second use case. In this use case, a small cell system 300 comprises a small cell baseband unit 302 that serves a set of small cell remote units 304. In this use case, the small cell baseband unit 302 and small cell remote units 304 communicate with each other over a switched Ethernet network 306 using a proprietary frequency-domain baseband IQ fronthaul interface format suitable for use over a switched Ethernet network. In the use case shown in FIG. 3, the Ethernet network 306 comprises a single Ethernet switch 308.

In this use case, a UDC 122 is configured to be used as a distribution card in order to couple a CAN 102 to the small cell remote units 304 via the Ethernet network 306 (and the associated Ethernet switch 308).

A first base station entity 108 is coupled to the CAN 102 via its analog RF interface using a dedicated RF donor card 112. Also, in this use case, a second base station entity 108 is coupled to the CAN 102 via a CPRI link using a dedicated digital donor card 112.

In this use case, the base station entities 108 coupled to the CAN 102 are coupled to, and are served by, the small cell remote units 304 coupled to the Ethernet network 306. The UDC 122, serving as a distribution card, provides the interface between the domain of the DAS and the domain of the small cell.

For each of the base station entities 108, the respective donor cards 112 receive downlink data communicated from that respective base station entity 108 in the interface format used by that base station entity 108, convert the downlink data to the particular digital fronthaul interface format natively used in the DAS 100 (which is a proprietary time-domain based IQ fronthaul interface format in this example), and communicate the converted downlink data over the backplane 114 of the CAN 102. In this use case, the backplane 114 multiplexes the converted downlink data for the first and second the base station entities 108 with each other and outputs the resulting multiplexed data to the UDC 122.

The UDC 122 (serving as a distribution card) receives the multiplexed data from the backplane 114 and, for each of the base station entities 108, converts the associated downlink data from the digital fronthaul interface format natively used in the DAS 100 to the proprietary frequency-domain baseband IQ fronthaul interface format natively used by the small cell system 300, and communicates it to the small remote units 304 by communicating the converted downlink data over the external communication link 130 used to couple that UDC 122 to the Ethernet switch 308 of the Ethernet network 306.

Each small cell remote unit 304 receives the converted downlink data for each base station entity 108 that was communicated from the UDC 122 over the Ethernet network 306. For each base station entity 108 coupled to the CAN 102, each small cell remote unit 304 uses the corresponding downlink data to generate one or more analog downlink RF signals that are radiated from one or more antennas 318 associated with that small cell remote unit 304 to user equipment served by that base station entity 108. Each small cell remote unit 304 does the same thing for downlink data communicated to it from the small cell baseband unit 302.

Likewise, each small cell remote unit 304, for each base station entity 108 coupled to the CAN 102, receives uplink data transmitted from user equipment served by that base station entity 108. The uplink user data is received as one or more analog uplink RF signals received via the one or more antennas 318 associated with that small cell remote unit 304. For each base station entity 108, the small cell remote unit 304 converts the received analog uplink RF signals in order to produce uplink data in the proprietary frequency-domain baseband IQ fronthaul interface format natively used in the small cell system 300 and communicates it to the UDC 122 via the Ethernet network 306. Also, each small cell remote unit 304 does the same thing in order to produce uplink data that is communicated to the small cell baseband unit 302.

The UDC 122 receives the uplink data produced by each small cell remote unit 304 for each base station entity 108 coupled to the CAN 102 in the proprietary frequency-domain baseband IQ fronthaul interface format natively used in the small cell system 300. The uplink data is received from the external communication link 130 used to couple the UDC 122 to the Ethernet switch 308 of the Ethernet network 306. The UDC 122 converts the received uplink data for each base station entity 108 from the proprietary frequency-domain baseband IQ fronthaul interface format natively used by the small cell system 300 to the digital fronthaul interface format used natively in the DAS 100.

For each base station entity 108, the backplane 114 in the CAN 102 extracts the individual streams of uplink baseband IQ samples generated by the various small cell remote units 304, performs a digital summation process for corresponding uplink baseband IQ samples received from the various small cell remote units 304, and outputs the summed uplink data to the respective donor card 112 in the digital fronthaul interface format natively used in the DAS 100. For each base station entity 108, the respective donor card 112 receives the summed uplink data from the backplane 114, converts the received summed uplink data to the interface format used by that base station entity 108, and communicates the converted uplink data to that base station entity 108.

In this use case, the UDC 122 enables base station entities 108 and small remote units 304 to be used with each other even though they do not natively support being able to do so. This can be done, for example, to provide neutral host capabilities to a small cell system 300 designed for use by a single operator and/or to provide support for wireless air interfaces (for example, 3G wireless interfaces) that the small cell system 300 does not natively support.

Figure 4:
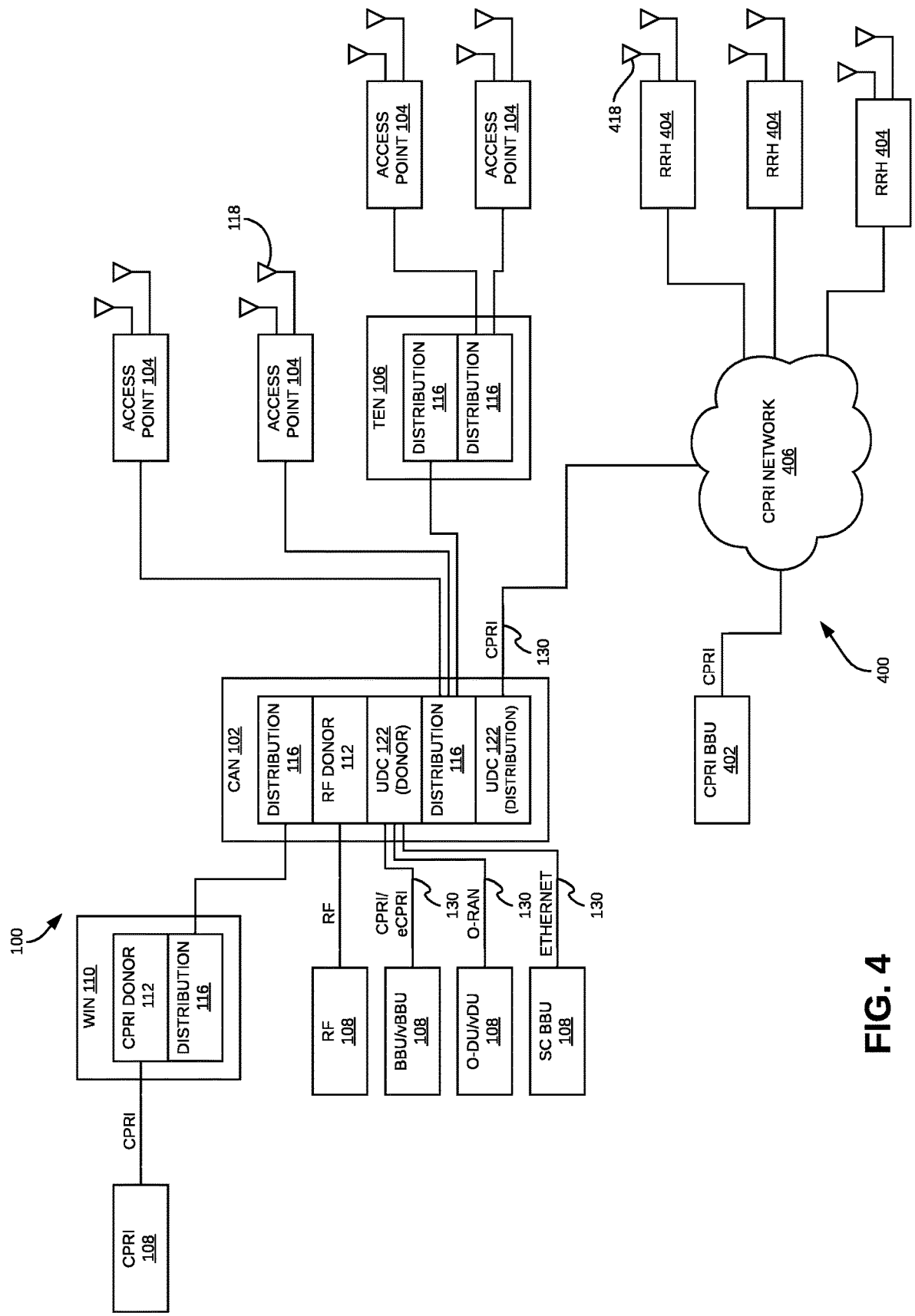
FIG. 4 is a block diagram of one exemplary embodiment of a third use case in which a universal digital card can be used.

FIG. 4 illustrates a third use case. The use case shown in FIG. 4 is similar to the use case shown in FIG. 1, except that an additional UDC 122 is used and configured to serve as a distribution card to couple the CAN 102 to a CPRI base station system 400 over one or more CPRI external communication links 130. In this use case, the CPRI system 400 comprises a CPRI baseband unit 402 that serves a set of CPRI remote radio heads (RRHs) units 404 (with each RRH 404 coupled to a respective set of antennas 418). In this use case, the CPRI baseband unit 402 and CPRI RRHs 404 communicate with each other over a CPRI network 406 using a CPRI time-domain baseband IQ fronthaul interface format.

For each CPRI external communication link 130, the additional UDC 122 (serving as a distribution card) converts between the digital fronthaul interface format natively used in the DAS 100 and the CPRI interface format used for communicating over that CPRI external communication link 130. By using an additional UDC 122 in this way, an existing CPRI base station system 400 can be used with newer types of base station entities 108 that do not natively support being used with that type of CPRI base station system 400.

Figure 5:
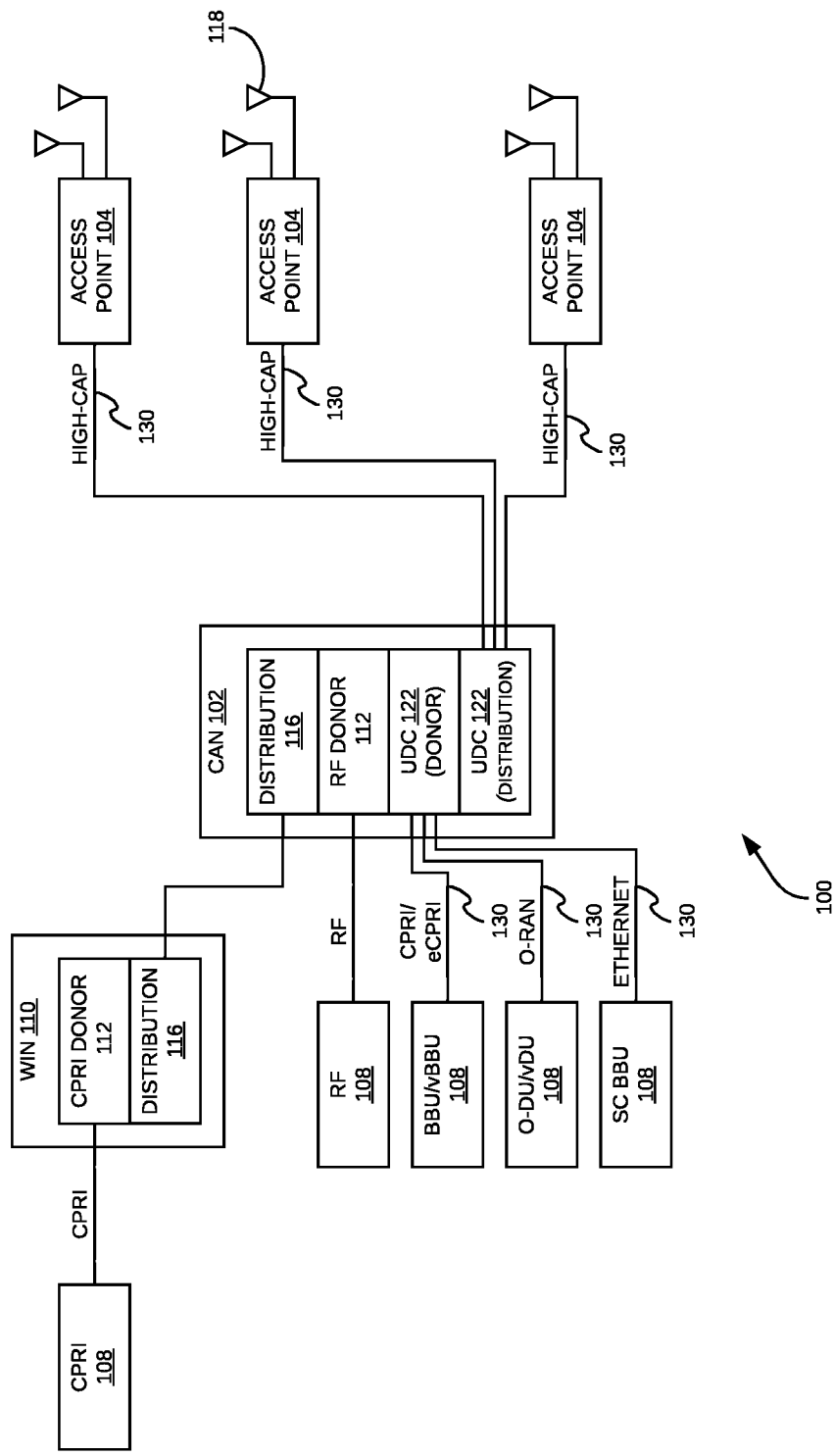
FIG. 5 is a block diagram of one exemplary embodiment of a fourth use case in which a universal digital card can be used.

FIG. 5 illustrates a fourth use case. The use case shown in FIG. 5 is similar to the use case shown in FIG. 1, except that additional UDCs 122 are used and configured to serve as high-capacity distribution cards to couple the CAN 102 to next-generation high-capacity access points 104 over high-capacity transport links 130. For each high-capacity transport link 130, one such UDC 122 (serving as a distribution card) converts between the digital fronthaul interface format natively used in the DAS 100 and the high-capacity transport interface format used for communicating over that high-capacity transport link 130. By using UDCs 122 in this way, legacy DAS nodes can be used with next generation high-capacity nodes, access points, and transport links.

Figure 6:
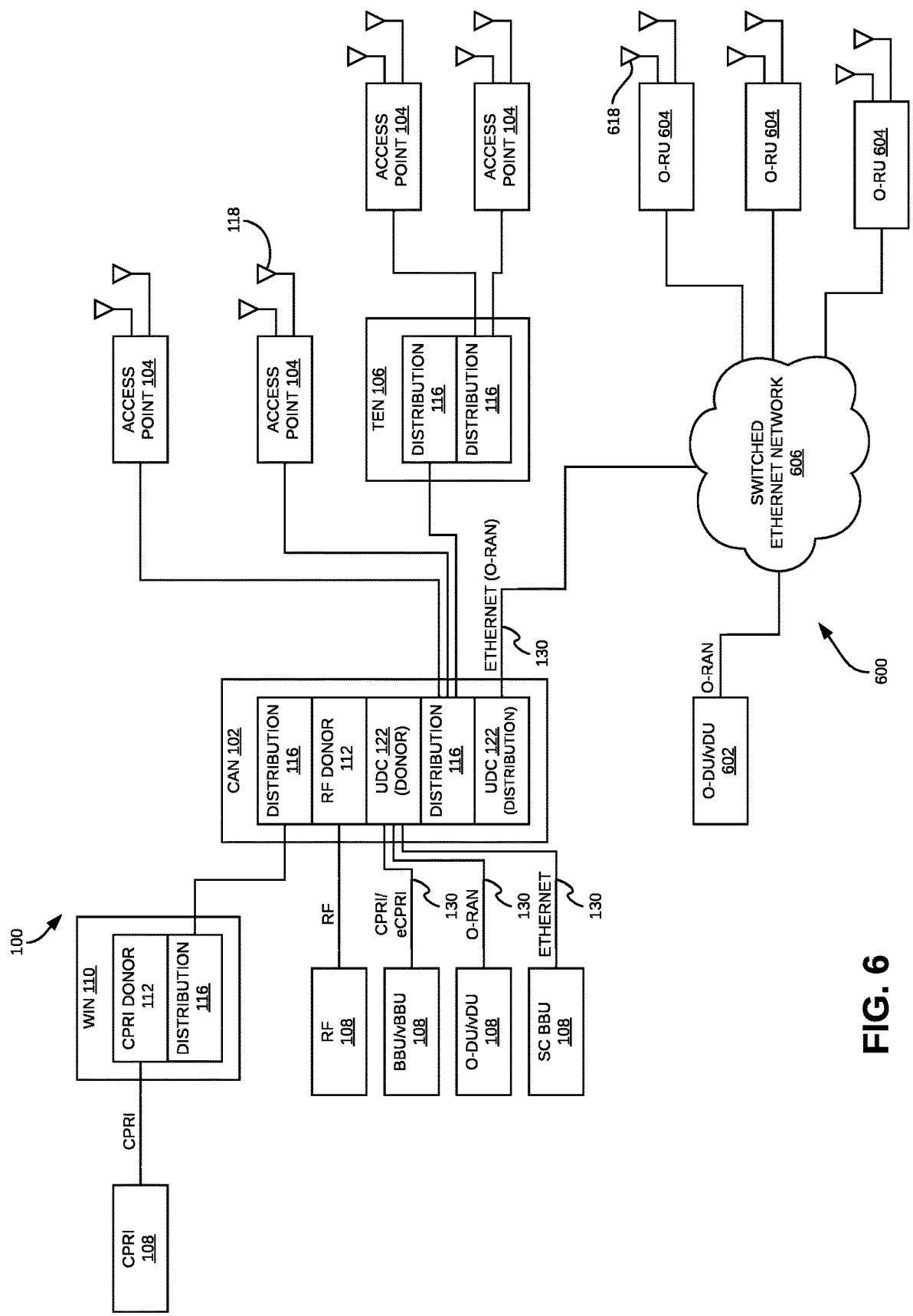
FIG. 6 is a block diagram of one exemplary embodiment of a fifth use case in which a universal digital card can be used.

FIG. 6 illustrates a fifth use case. The use case shown in FIG. 6 is similar to the use case shown in FIG. 4, except that the additional UDC 122 that is configured to serve as a distribution card is used to couple the CAN 102 to a O-RAN base station system 600 over one or more Ethernet external communication links 130. In this use case, the O-RAN system 600 comprises an O-DU/v-DU 602 that serves a set of O-RUs 604 (with each O-RU 604 coupled to a respective set of antennas 618). In this use case, the O-DUN-DU 602 and O-RUs 604 communicate with each other over a switched Ethernet network 606 using an O-RAN fronthaul interface format. For each Ethernet external communication link 130, the additional UDC 122 (serving as a distribution card) converts between the digital fronthaul interface format natively used in the DAS 100 and the O-RAN fronthaul interface format used for communicating over that Ethernet external communication link 130 and the switched Ethernet network 606.

Figure 7:
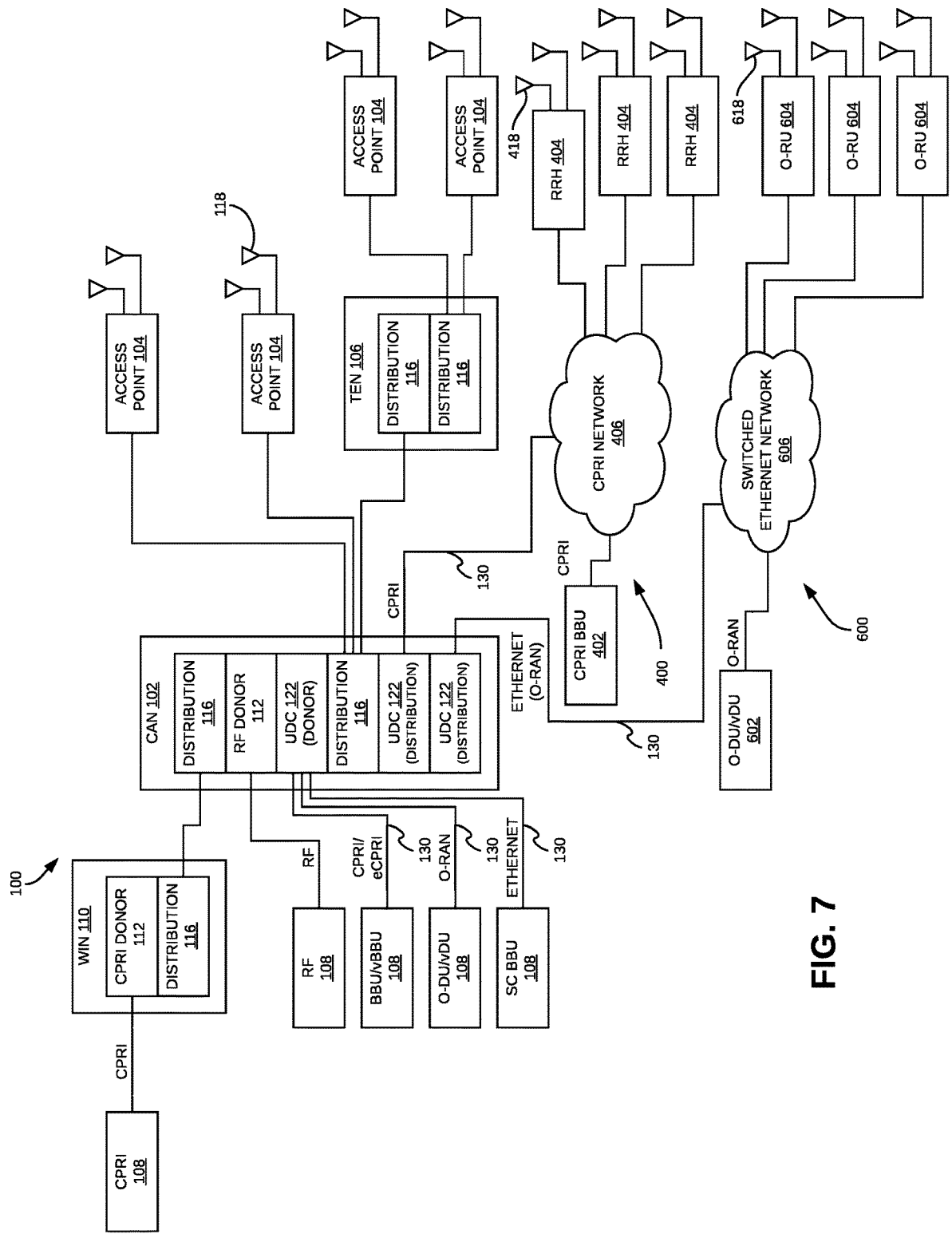
FIG. 7 is a block diagram of one exemplary embodiment of a sixth use case in which a universal digital card can be used.

FIG. 7 illustrates a sixth use case. The use case shown in FIG. 7 is similar to (and a combination of) the use cases shown in FIGS. 4 and 6. In the use case shown in FIG. 7, one additional UDC 122 is used and configured to serve as a distribution card to couple the CAN 102 to a CPRI base station system 400 over one or more CPRI external communication links 130 as described above in connection with FIG. 4. Also, in this use case, a second additional UDC 122 is used and configured to serve as a distribution card to couple the CAN 102 to an O-RAN base station system 600 over one or more Ethernet external communication links 130 as described above in connection with FIG. 6.

The UDC 122 can be used in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a universal digital card (UDC) for use in a subrack of a node of a distributed antenna system (DAS), the UDC comprising: an external digital interface to communicatively couple the UDC to an external communication link used to transmit and receive data in any of a plurality of different external interface formats; and a backplane interface to communicatively couple the UDC to a backplane of the subrack, wherein the backplane is configured to communicate fronthaul data in a digital fronthaul interface format natively used in the DAS; wherein the UDC is configured to: receive data formatted according to any of the plurality of external interface formats from the external communication link via the external digital interface; convert the received data to the digital fronthaul interface format natively used in the DAS; communicate the converted data over the backplane of the subrack via the backplane interface; receive data formatted according to the digital fronthaul interface format natively used in the DAS from the backplane of the subrack via the backplane interface; convert the received data to any of the plurality of external interface formats; and communicate the converted data over the external communication link via the external digital interface; and wherein the UDC is configured to be selectively used either as: a donor card to communicatively couple the node to one or more base station entities via the external digital interface; or a distribution card to communicatively couple the node to one or more non-DAS nodes, hubs, switches, or remote radio heads or one or more other DAS nodes or access points.

Example 2 includes the UDC of Example 1, wherein the digital fronthaul interface format natively used in the DAS comprises a proprietary time-domain baseband in-phase and quadrature (IQ) fronthaul format.

Example 3 includes the UDC of Example 2, wherein the plurality of external interface formats comprises at least one of: an Open Radio Access Network (O-RAN) fronthaul interface format that uses an Option 7-2 functional split; a Common Public Radio Interface (CPRI) fronthaul interface format; a compressed CPRI fronthaul interface format; an evolved CPRI (eCPRI) fronthaul interface format; an Institute of Electrical and Electronics Engineers (IEEE) 1914.3 Radio-over-Ethernet (ROE) interface format; a functional application programming interface (FAPI) or a network FAPI (nFAPI) interface format; and a proprietary frequency-domain baseband IQ fronthaul interface format configured for use over a switched Ethernet network.

Example 4 includes the UDC of any of Examples 1-3, wherein the base station entities that the UDC is configured to couple the node to includes at least one of: a baseband unit (BBU) or virtualized BBU (vBBU) configured to communicate over the external communication link using a Common Public Radio Interface (CPRI) fronthaul interface format or an evolved Common Public Radio Interface (eCPRI) interface format; an Open Radio Access Network (O-RAN) Distributed Unit (O-DU) or virtualized O-DU (vDU) configured to communicate over the external communication link using an O-RAN fronthaul interface format; and a small cell BBU (SC BBU) configured to communicate over the external communication link using a proprietary frequency-domain baseband IQ fronthaul interface format configured for use over a switched Ethernet network.

Example 5 includes the UDC of any of Examples 1-4, wherein the one or more DAS nodes or access points that the UDC is configured to couple the node to includes one or more high-capacity DAS nodes or access point configured to communicate over the external communication link using a high-capacity transport interface format.

Example 6 includes the UDC of any of Examples 1-5, wherein the one or more non-DAS nodes, hubs, or remote radio heads that the UDC is configured to couple the node to includes one or more: small cell radio points configured to communicate over the external communication link using a proprietary frequency-domain baseband IQ fronthaul interface format configured for use over a switched Ethernet network; Common Public Radio Interface (CPRI) remote radio heads configured to communicate over the external communication link using a CPRI fronthaul interface format; evolved CPRI (eCPRI) remote radio heads configured to communicate over the external communication link using an eCPRI fronthaul interface format; and Open Radio Access Network (O-RAN) Remote Units (O-RUs) configured to communicate over the external communication link using an O-RAN fronthaul interface format.

Example 7 includes the UDC of any of Examples 1-6, wherein the node of the DAS comprises at least one of a central access node (CAN), a transport expansion node (TEN), and a wide-area integration node (WIN).

Example 8 includes the UDC of any of Examples 1-7, wherein other types of donor cards and/or other types distribution cards are used in the subrack.

Example 9 includes the UDC of Example 8, wherein the other types of donor cards comprise at least one of: RF donor cards, and CPRI digital donor cards.

Example 10 includes the UDC of any of Examples 8-9, wherein the other types of distribution cards comprise fiber distribution cards and copper twisted-pair distribution cards.

Example 11 includes a node of a distributed antenna system (DAS) comprising: a subrack comprising a plurality of slots and a backplane; and a universal digital card (UDC) comprising: an external digital interface to communicatively couple the UDC to an external communication link used to transmit and receive data in any of a plurality of different external interface formats; and a backplane interface to communicatively couple the UDC to the backplane of the subrack, wherein the backplane is configured to communicate fronthaul data in a digital fronthaul interface format natively used in the DAS; wherein the UDC is configured to: receive data formatted according to any of the plurality of external interfaces formats from the external communication link via the external digital interface; convert the received data to the digital fronthaul interface format natively used in the DAS; communicate the converted data over the backplane of the subrack via the backplane interface; receive data formatted according to the digital fronthaul interface format natively used in the DAS from the backplane of the subrack via the backplane interface; convert the received data to any of the plurality of external interface formats; and communicate the converted data over the external communication link via the external digital interface; and wherein the UDC is configured to be selectively used either as: a donor card to communicatively couple the node to one or more base station entities via the external digital interface; or a distribution card to communicatively couple the node to one or more non-DAS nodes, hubs, switches, or remote radio heads or one or more other DAS nodes or access points.

Example 12 includes the node of Example 11, wherein the digital fronthaul interface format natively used in the DAS comprises a proprietary time-domain baseband in-phase and quadrature (IQ) fronthaul format.

Example 13 includes the node of Example 12, wherein the plurality of external interface formats comprises at least one of: an Open Radio Access Network (O-RAN) fronthaul interface format that uses an Option 7-2 functional split; a Common Public Radio Interface (CPRI) fronthaul interface format; a compressed CPRI fronthaul interface format; an evolved CPRI (eCPRI) fronthaul interface format; an Institute of Electrical and Electronics Engineers (IEEE) 1914.3 Radio-over-Ethernet (ROE) interface format; a functional application programming interface (FAPI) or a network FAPI (nFAPI) interface format; and a proprietary frequency-domain baseband IQ fronthaul interface format configured for use over a switched Ethernet network.

Example 14 includes the node of any of Examples 11-13, wherein the base station entities that the UDC is configured to couple the node to includes at least one of: a baseband unit (BBU) or virtualized BBU (vBBU) configured to communicate over the external communication link using a Common Public Radio Interface (CPRI) fronthaul interface format or an evolved Common Public Radio Interface (eCPRI) interface format; an Open Radio Access Network (O-RAN) Distributed Unit (O-DU) or virtualized O-DU (vDU) configured to communicate over the external communication link using an O-RAN fronthaul interface format; and a small cell BBU (SC BBU) configured to communicate over the external communication link using a proprietary frequency-domain baseband IQ fronthaul interface format configured for use over a switched Ethernet network.

Example 15 includes the node of any of Examples 11-14, wherein the one or more DAS nodes or access points that the UDC is configured to couple the node to includes one or more high-capacity DAS nodes or access point configured to communicate over the external communication link using a high-capacity transport interface format.

Example 16 includes the node of any of Examples 11-15, wherein the one or more non-DAS nodes, hubs, or remote radio heads that the UDC is configured to couple the node to includes one or more: small cell radio points configured to communicate over the external communication link using a proprietary frequency-domain baseband IQ fronthaul interface format configured for use over a switched Ethernet network; Common Public Radio Interface (CPRI) remote radio heads configured to communicate over the external communication link using a CPRI fronthaul interface format; evolved CPRI (eCPRI) remote radio heads configured to communicate over the external communication link using an eCPRI fronthaul interface format; and Open Radio Access Network (O-RAN) Remote Units (O-RUs) configured to communicate over the external communication link using an O-RAN fronthaul interface format.

Example 17 includes the node of any of Examples 11-16, wherein the node of the DAS comprises at least one of a central access node (CAN), a transport expansion node (TEN), and a wide-area integration node (WIN).

Example 18 includes the node of any of Examples 11-17, wherein other types of donor cards and/or other types distribution cards are used in the subrack.

Example 19 includes the node of Example 18, wherein the other types of donor cards comprise at least one of: RF donor cards, and CPRI digital donor cards.

Example 20 includes the node of any of Examples 18-19, wherein the other types of distribution cards comprise fiber distribution cards and copper twisted-pair distribution cards.

What is claimed is:

1. A universal digital card (UDC) for use in a distributed antenna system (DAS), the UDC comprising:
    an external digital interface to communicatively couple the UDC to an external communication link used to transmit and receive data in any of a plurality of different external interface formats; and
    wherein the UDC is configured to:
        receive data formatted according to any of the plurality of external interface formats from the external communication link via the external digital interface;
        transmit data formatted according to any of the plurality of external interface formats over the external communication link via the external digital interface; and
    wherein the UDC is configured to be selectively used either as:
        a donor card to communicatively couple the node to one or more base station entities via the external digital interface; or
        a distribution card to communicatively couple the node to one or more non-DAS nodes, hubs, switches, or remote radio heads or one or more other DAS nodes or access points.

2. The UDC of claim 1, wherein the UDC is configured for use in a subrack of a node of the DAS;
    wherein the UDC further comprises:
        a backplane interface to communicatively couple the UDC to a backplane of the subrack, wherein the backplane is configured to communicate fronthaul data in a digital fronthaul interface format natively used in the DAS;
    wherein the UDC is configured to:
        convert the received data to the digital fronthaul interface format natively used in the DAS;
        communicate the converted data over the backplane of the subrack via the backplane interface;
        receive data formatted according to the digital fronthaul interface format natively used in the DAS from the backplane of the subrack via the backplane interface; and
        convert the received data to any of the plurality of external interface formats.

3. The UDC of claim 2, wherein the digital fronthaul interface format natively used in the DAS comprises a proprietary time-domain baseband in-phase and quadrature (IQ) fronthaul format.

4. The UDC of claim 3, wherein the plurality of external interface formats comprises at least one of:
    an Open Radio Access Network (O-RAN) fronthaul interface format that uses an Option 7-2 functional split;
    a Common Public Radio Interface (CPRI) fronthaul interface format;
    a compressed CPRI fronthaul interface format;
    an evolved CPRI (eCPRI) fronthaul interface format;
    an Institute of Electrical and Electronics Engineers (IEEE) 1914.3 Radio-over-Ethernet (ROE) interface format;
    a functional application programming interface (FAPI) or a network FAPI (nFAPI) interface format; and
    a proprietary frequency-domain baseband IQ fronthaul interface format configured for use over a switched Ethernet network.

5. The UDC of claim 2, wherein the base station entities that the UDC is configured to couple the node to includes at least one of:
- a baseband unit (BBU) or virtualized BBU (vBBU) configured to communicate over the external communication link using a Common Public Radio Interface (CPRI) fronthaul interface format or an evolved Common Public Radio Interface (eCPRI) interface format;
- an Open Radio Access Network (O-RAN) Distributed Unit (O-DU) or virtualized O-DU (vDU) configured to communicate over the external communication link using an O-RAN fronthaul interface format; and
- a small cell BBU (SC BBU) configured to communicate over the external communication link using a proprietary frequency-domain baseband IQ fronthaul interface format configured for use over a switched Ethernet network.

6. The UDC of claim 2, wherein the one or more DAS nodes or access points that the UDC is configured to couple the node to includes one or more high-capacity DAS nodes or access point configured to communicate over the external communication link using a high-capacity transport interface format.

7. The UDC of claim 2, wherein the one or more non-DAS nodes, hubs, or remote radio heads that the UDC is configured to couple the node to includes one or more:
- small cell radio points configured to communicate over the external communication link using a proprietary frequency-domain baseband IQ fronthaul interface format configured for use over a switched Ethernet network;
- Common Public Radio Interface (CPRI) remote radio heads configured to communicate over the external communication link using a CPRI fronthaul interface format;
- evolved CPRI (eCPRI) remote radio heads configured to communicate over the external communication link using an eCPRI fronthaul interface format; and
- Open Radio Access Network (O-RAN) Remote Units (O-RUs) configured to communicate over the external communication link using an O-RAN fronthaul interface format.

8. The UDC of claim 2, wherein the node of the DAS comprises at least one of a central access node (CAN), a transport expansion node (TEN), and a wide-area integration node (WIN).

9. The UDC of claim 2, wherein other types of donor cards and/or other types distribution cards are used in the subrack.

10. The UDC of claim 9, wherein the other types of donor cards comprise at least one of: RF donor cards, and CPRI digital donor cards.

11. The UDC of claim 9, wherein the other types of distribution cards comprise fiber distribution cards and copper twisted-pair distribution cards.

12. A node of a distributed antenna system (DAS) comprising:
- a universal digital card (UDC) comprising:
  - an external digital interface to communicatively couple the UDC to an external communication link used to transmit and receive data in any of a plurality of different external interface formats; and
  - wherein the UDC is configured to:
    - receive data formatted according to any of the plurality of external interfaces formats from the external communication link via the external digital interface; and
    - transmit communicate the converted data formatted according to any of the plurality of external interface formats over the external communication link via the external digital interface; and
  - wherein the UDC is configured to be selectively used either as:
    - a donor card to communicatively couple the node to one or more base station entities via the external digital interface; or
    - a distribution card to communicatively couple the node to one or more non-DAS nodes, hubs, switches, or remote radio heads or one or more other DAS nodes or access points.

13. The node of claim 12, wherein the node further comprises a subrack comprising a plurality of slots and a backplane;
- wherein the UDC comprises:
  - a backplane interface to communicatively couple the UDC to the backplane of the subrack, wherein the backplane is configured to communicate fronthaul data in a digital fronthaul interface format natively used in the DAS;
- wherein the UDC is configured to:
  - convert the received data to the digital fronthaul interface format natively used in the DAS;
  - communicate the converted data over the backplane of the subrack via the backplane interface;
  - receive data formatted according to the digital fronthaul interface format natively used in the DAS from the backplane of the subrack via the backplane interface; and convert the received data to any of the plurality of external interface formats.

14. The node of claim 13, wherein the digital fronthaul interface format natively used in the DAS comprises a proprietary time-domain baseband in-phase and quadrature (IQ) fronthaul format.

15. The node of claim 14, wherein the plurality of external interface formats comprises at least one of:
- an Open Radio Access Network (O-RAN) fronthaul interface format that uses an Option 7-2 functional split;
- a Common Public Radio Interface (CPRI) fronthaul interface format;
- a compressed CPRI fronthaul interface format;
- an evolved CPRI (eCPRI) fronthaul interface format;
- an Institute of Electrical and Electronics Engineers (IEEE) 1914.3 Radio-over-Ethernet (ROE) interface format;
- a functional application programming interface (FAPI) or a network FAPI (nFAPI) interface format; and
- a proprietary frequency-domain baseband IQ fronthaul interface format configured for use over a switched Ethernet network.

16. The node of claim 13, wherein the base station entities that the UDC is configured to couple the node to includes at least one of:
- a baseband unit (BBU) or virtualized BBU (vBBU) configured to communicate over the external communication link using a Common Public Radio Interface (CPRI) fronthaul interface format or an evolved Common Public Radio Interface (eCPRI) interface format;
- an Open Radio Access Network (O-RAN) Distributed Unit (O-DU) or virtualized O-DU (vDU) configured to communicate over the external communication link using an O-RAN fronthaul interface format; and
- a small cell BBU (SC BBU) configured to communicate over the external communication link using a proprietary frequency-domain baseband IQ fronthaul interface format configured for use over a switched Ethernet network.

17. The node of claim 13, wherein the one or more DAS nodes or access points that the UDC is configured to couple the node to includes one or more high-capacity DAS nodes or access point configured to communicate over the external communication link using a high-capacity transport interface format.

18. The node of claim 13, wherein the one or more non-DAS nodes, hubs, or remote radio heads that the UDC is configured to couple the node to includes one or more:
- small cell radio points configured to communicate over the external communication link using a proprietary frequency-domain baseband IQ fronthaul interface format configured for use over a switched Ethernet network;
- Common Public Radio Interface (CPRI) remote radio heads configured to communicate over the external communication link using a CPRI fronthaul interface format;
- evolved CPRI (eCPRI) remote radio heads configured to communicate over the external communication link using an eCPRI fronthaul interface format; and
- Open Radio Access Network (O-RAN) Remote Units (O-RUs) configured to communicate over the external communication link using an O-RAN fronthaul interface format.

19. The node of claim 13, wherein the node of the DAS comprises at least one of a central access node (CAN), a transport expansion node (TEN), and a wide-area integration node (WIN).

20. The node of claim 13, wherein other types of donor cards and/or other types distribution cards are used in the subrack.

21. The node of claim 20, wherein the other types of donor cards comprise at least one of: RF donor cards, and CPRI digital donor cards.

22. The node of claim 20, wherein the other types of distribution cards comprise fiber distribution cards and copper twisted-pair distribution cards.

* * * * *

UNITED STATES PATENT AND TRADEMARK OFFICE
CERTIFICATE OF CORRECTION

PATENT NO. : 11,909,432 B2  
APPLICATION NO. : 17/391570  
DATED : February 20, 2024  
INVENTOR(S) : Kummetz et al.

Page 1 of 1

It is certified that error appears in the above-identified patent and that said Letters Patent is hereby corrected as shown below:

In the Claims

Column 20, Line 15, Claim 1 insert --and-- between "digital interface;" and "transmit data"

Column 22, Line 1, Claim 12 replace "transmit communicate the converted data formatted" with --transmit data formatted--

Signed and Sealed this  
Ninth Day of July, 2024

Katherine Kelly Vidal  
*Director of the United States Patent and Trademark Office*